(No Model.)

G. W. CROUSE.
JACK FOR REPAIRING MACHINES.

No. 461,321. Patented Oct. 13, 1891.

WITNESSES:
J. B. Clark.
C. Sedgwick.

INVENTOR:
G. W. Crouse

BY
ATTORNEYS

UNITED STATES PATENT OFFICE.

GEORGE W. CROUSE, OF LEXINGTON, NORTH CAROLINA.

JACK FOR REPAIRING MACHINES.

SPECIFICATION forming part of Letters Patent No. 461,321, dated October 13, 1891.

Application filed March 19, 1891. Serial No. 385,642. (No model.)

*To all whom it may concern:*

Be it known that I, GEORGE W. CROUSE, of Lexington, in the county of Davidson and State of North Carolina, have invented a new and Improved Jack for Repairing Machines, of which the following is a full, clear, and exact description.

The object of the invention is to provide a new and improved jack which is simple and durable in construction and more especially designed for conveniently examining, taking apart, cleaning, and repairing machinery, such as sewing-machines and the like.

The invention consists of two screw-rods arranged in line with each other and mounted to turn in heads held adjustably on a table or bench, one of the screw-rods being provided with a fixed clamp adapted to engage one end of the bed-plate of the machine under treatment, the other end of the said bed-plate being engaged by a clamp mounted to turn loosely on the second screw-rod.

The invention also consists of certain parts and details and combinations of the same, as will be hereinafter fully described, and then pointed out in the claims.

Reference is to be had to the accompanying drawings, forming a part of this specification, in which similar letters of reference indicate corresponding parts in all the figures.

Figure 1:
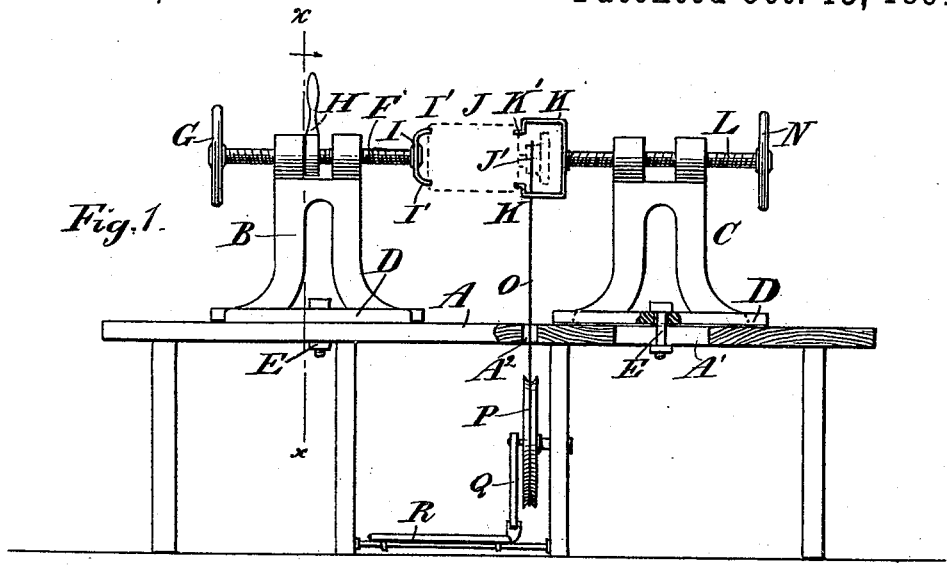
Figure 2:
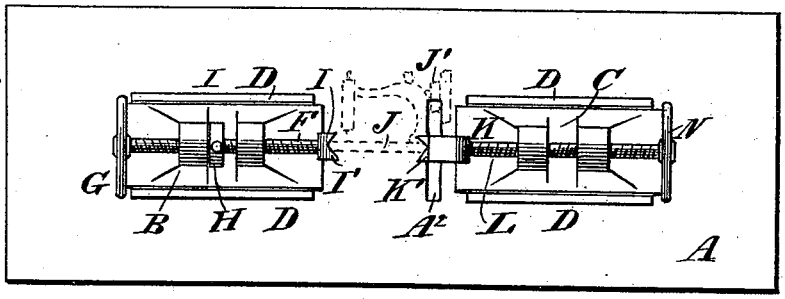
Figure 3:
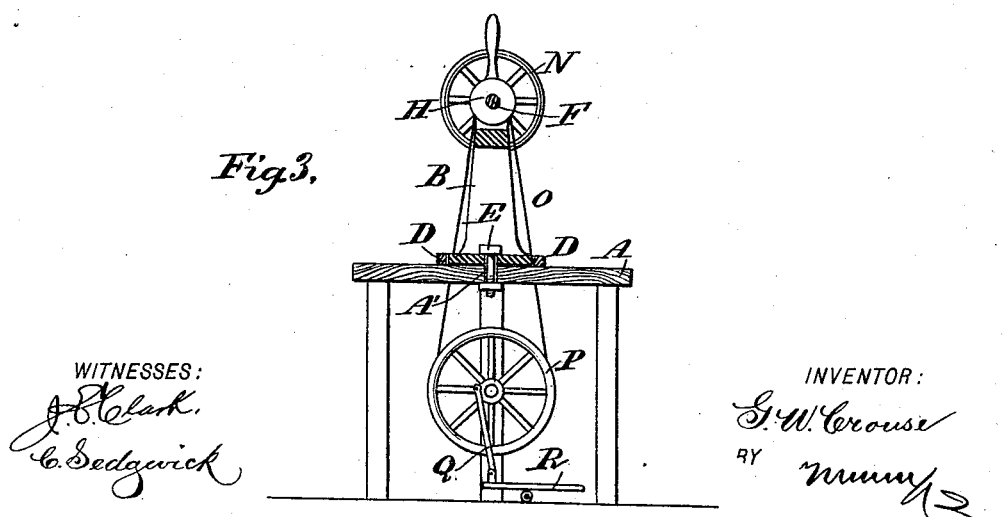

Figure 1 is a side elevation of the improvement with parts in section. Fig. 2 is a plan view of the same, and Fig. 3 is a transverse section of the same on the line $x\ x$ of Fig. 1.

The improved jack for repairing machines is provided with a suitable table or bench A, on which are held adjustably the two heads B and C, located opposite each other and mounted to slide longitudinally in guideways D, secured on the top of the said table or bench A. Each of the heads B or C is provided with a clamping-bolt E, extending downwardly through a suitable slot A', formed longitudinally in the table A. The nut on the clamping-bolt E is adapted to engage the under side of the table, so as to securely hold the respective head in place after being properly adjusted longitudinally in the guideways D. In the upper part of the head B is mounted to screw a screw-rod F, provided on its outer end with a hand-wheel G for conveniently screwing the said screw-rod forward or backward in the head B. A handled nut H engages the said screw-rod F between the two bearings of the head B and serves to lock the screw-rod in place after it is properly adjusted. On the inner end of the screw-rod F is rigidly secured a clamp I, preferably made in U shape, having its ends I' formed with V-shaped notches adapted to engage one end of the bed-plate J of the machine to be treated. The other end of the bed-plate is adapted to be engaged by V-shaped notches in the ends K' of a clamp K, mounted to turn loosely on the inner end of a screw-rod L, screwing in the head C and arranged in line with the screw-rod F.

On the outer end of the screw-rod L is secured a hand-wheel N for conveniently screwing the said screw-rod L forward or backward in the head C, so as to move the clamp K in or out of contact with the end of the bed-plate J. The clamp K is made in such a manner that the drive-wheel J' of the machine under treatment can conveniently pass into the clamp, as is plainly illustrated in Fig. 1, the clamp being preferably loop-shaped, as shown.

In order to actuate the machine under treatment, so as to adjust the several parts to the proper time, a belt O is adapted to pass over the wheel J', and extends at the side of the clamp K downward through a slot $A^2$ in the table or bench A. The lower part of the belt O passes under a grooved wheel P, mounted to turn on a suitable stud arranged on the frame-work of the table A.

A pitman Q is connected with a wrist-pin on one face of the wheel P, the said pitman being also connected with a treadle R, arranged below the table and pivoted either on the floor on which the table stands or on suitable brackets on the frame of the table.

The device is used as follows: When a sewing-machine, for instance, is to be repaired, cleaned, or examined, the bed-plate J of the sewing-machine is passed with one end into the V-shaped notches of the ends I' of the clamp I, the latter being held in a fixed position by the handled nut H locking the screw-rod in place. The clamp K is sufficiently far from the clamp I so as to permit of placing the bed-plate J in place. Then the operator turns the handle N so as to screw the rod L inward, the operator taking hold of the clamp K, so as to engage the notched ends K' with the right-hand end of the bed-plate J. By screwing up the hand-wheel N the clamp K is moved firmly in contact with the bed-plate, so that the sewing-machine is securely clamped in place between the two clamps I and K. The operator can now conveniently examine the sewing-machine, take it apart for cleaning, repairing, or other purposes, and then reassemble the several parts.

It will be seen that by the operator slightly loosening the handled nut H and turning the hand-wheel G the sewing-machine can be swung into any desired position, so that the operator can get conveniently at the parts on the under side of the sewing-machine or at those on the top of the same, as the case may require. The sewing-machine can be held in any desired position by the handled nut H being screwed up to lock the screw-rod F in place, as previously described. When the several parts have been reassembled and the operator desires to actuate the sewing-machine, so as to adjust the several parts to the proper time, then the belt O is passed over the driving-wheel J' of the machine, and also over the wheel P. The operator by actuating the treadle R can now conveniently run the sewing-machine for the purpose above mentioned.

Having thus fully described my invention, I claim as new and desire to secure by Letters Patent—

1. In a jack for repairing machines, the combination, with two heads held on a table or bench, of screw-rods screwing in the said heads and arranged in line with each other, and two clamps held on the inner ends of the said screw-rods, one of the clamps being rigidly attached to its screw-rod, while the other is mounted loosely, substantially as shown and described.

2. In a jack for repairing machines, the combination, with two heads held on a table or bench, of screw-rods screwing in the said heads and arranged in line with each other, two clamps held on the inner ends of the said screw-rods, one of the clamps being rigidly attached to its screw-rod, while the other is mounted loosely, and a handled nut for locking the screw-rod having the fixed clamp into place on its head, substantially as shown and described.

3. In a jack for repairing machines, the combination, with a table or bench, of two heads held adjustably on the said table or bench, screw-rods screwing in each of the said heads and arranged in line with each other, two clamps held on the inner ends of the said screw-rods, one of the clamps being fixed to its respective screw-rod and the other clamp being mounted to turn loosely on its screw-rod, and mechanism, substantially as described, arranged on the said table to impart motion to the drive mechanism of the machine held between the said clamps, substantially as shown and described.

4. In a jack for repairing machines, the combination, with a table or bench, of two heads held adjustably on the said table or bench, screw-rods screwing in each of the said heads and arranged in line with each other, two clamps held on the inner ends of the said screw-rods, one of the clamps being fixed to its respective screw-rod and the other clamp being mounted to turn loosely on its screw-rod, and a handled nut held on the screw-rod carrying the said fixed clamp to lock the screw-rod on its head, substantially as shown and described.

5. In a jack for repairing machines, the combination, with two adjustable heads, of screw-rods mounted to screw in the said heads and arranged in line with each other, hand-wheels held on the outer ends of the said screw-rods for conveniently turning the latter, and two clamps held on the inner ends of the said screw-rods, one of the said clamps being fastened rigidly to its screw-rod and the other mounted to turn loosely on its screw-rod, both clamps having inwardly-projecting ends with V-shaped notches to engage the ends of the bed-plate of the machine under treatment, substantially as shown and described.

GEORGE W. CROUSE.

Witnesses:
M. K. CRAWFORD,
WILLIAM W. HIX.